United States Patent [19]

Coelho

[11] Patent Number: 6,100,933
[45] Date of Patent: Aug. 8, 2000

[54] PROCESS AND APPARATUS FOR COMPRESSING AND DECOMPRESSING DIGITAL VIDEO SIGNALS USING HORIZONTALLY-BASED VECTOR QUANTIZATION

[75] Inventor: Rohan Coelho, Portland, Oreg.

[73] Assignee: Intel Corporation, Santa Clara, Calif.

[21] Appl. No.: 08/697,637

[22] Filed: Aug. 29, 1996

Related U.S. Application Data

[63] Continuation of application No. 08/332,827, Oct. 31, 1994, abandoned.

[51] Int. Cl.[7] .................................................. H04N 7/24
[52] U.S. Cl. ................................. 348/420; 348/390
[58] Field of Search ............................ 348/234, 261.2, 348/261.3, 384, 390, 403, 409, 415, 420, 699, 432; 382/232, 233, 236, 238; H04N 7/130, 7/24, 7/32

[56] References Cited

U.S. PATENT DOCUMENTS

| | | | |
|---|---|---|---|
| 4,953,214 | 8/1990 | Takeguchi et al. | 348/409 |
| 5,153,719 | 10/1992 | Ibenthal | 348/699 |
| 5,333,212 | 7/1994 | Ligtenberg | 348/390 |
| 5,367,629 | 11/1994 | Chu et al. | 348/403 |
| 5,428,389 | 6/1995 | Ito et al. | 348/403 |
| 5,440,346 | 8/1995 | Alattar et al. | 348/420 |
| 5,459,518 | 10/1995 | Wickstrom et al. | 348/420 |
| 5,471,243 | 11/1995 | Suzuki et al. | 348/234 |

*Primary Examiner*—Richard Lee
*Attorney, Agent, or Firm*—Duane, Morris & Heckscher LLP; William H. Murray; N. Stephen Kinsella

[57] ABSTRACT

A method, apparatus, computer system, and computer-readable medium for compressing a two-dimensional array of pixels. A plurality of first column pixel differences is generated by differencing successive pixels in a first column with a first pixel of the first column of the array. A plurality of row pixel differences is generated for each row of the array by differencing successive pixels in said each row with an adjacent previous pixel in said each row and a compressed digital video signal representative of the two-dimensional array of pixels is formed by compressing each first column pixel difference of the plurality of first column pixel differences and by compressing each row pixel difference of the plurality of row pixel differences for each row of the array.

12 Claims, 4 Drawing Sheets

PROCESS AND APPARATUS FOR COMPRESSING AND DECOMPRESSING DIGITAL VIDEO SIGNALS USING HORIZONTALLY-BASED VECTOR QUANTIZATION

This is a continuation of application Ser. No. 08/332,827 filed on Oct. 31, 1994, now abandoned.

FIELD OF THE INVENTION

The present invention relates to image processing, and, in particular, to systems for providing compressed digital video signals representative of full color motion video images.

BACKGROUND OF THE INVENTION

Digital video images are typically compressed using difference encoding. In order to achieve data compression, such systems typically encode only the difference between pixels in lieu of encoding each pixel in the image as a stand alone value. Since the differences between pixels are typically small, difference encoding often results in substantial data compression.

Known difference encoding systems determine the pixel differences used for image compression by differencing neighboring vertically aligned pixels in an image. More particularly, in such systems, each pixel in a first horizontal row of an image is vertically differenced with a corresponding vertically aligned pixel positioned in a second horizontal row immediately below the first row. The pixels in the image being encoded are typically processed in a horizontal scan order so that pointer incrementation involves simple incrementation along the horizontal axis.

It was found that when digital video data was encoded in accordance with blocks of pixels, as opposed to horizontal lines, vertical differencing of pixels was not optimal. It was found that performing vertical pixel differencing for pixels in a block of pixels and then moving to a next block in a horizontal manner created a zig-zag pattern during the encoding process. The drawbacks caused by this zig-zag effect are demonstrated by the following example wherein 4×4 blocks of pixels in an image being encoded are sequentially processed in raster-scan order. In the example, the first block (in the upper-leftmost corner of the image) is encoded as follows:

Pixel(row 1, col. 1) is differenced with Pixel(row 0, col. 1)
Pixel(row 2, col. 1) is differenced with Pixel(row 1, col. 1)
Pixel(row 3, col. 1) is differenced with Pixel(row 2, col. 1)
Pixel(row 4, col. 1) is differenced with Pixel(row 3, col. 1)
Pixel(row 1, col. 2) is differenced with Pixel(row 0, col. 2)
Pixel(row 2, col. 2) is differenced with Pixel(row 1, col. 2)
Pixel(row 3, col. 2) is differenced with Pixel(row 2, col. 2)
Pixel(row 4, col. 2) is differenced with Pixel(row 3, col. 2)
Pixel(row 1, col. 3) is differenced with Pixel(row 0, col. 3)
Pixel(row 2, col. 3) is differenced with Pixel(row 1, col. 3)
Pixel(row 3, col. 3) is differenced with Pixel(row 2, col. 3)
Pixel(row 4, col. 3) is differenced with Pixel(row 3, col. 3)
Pixel(row 1, col. 4) is differenced with Pixel(row 0, col. 4)
Pixel(row 2, col. 4) is differenced with Pixel(row 1, col. 4)
Pixel(row 3, col. 4) is differenced with Pixel(row 2, col. 4)
Pixel(row 4, col. 4) is differenced with Pixel(row 3, col. 4)

After this first block is processed, the system next turns to the first pixel in the 4×4 block to the right of the first block, i.e., the pixel at row 1, col. 5, for encoding. This represents traversing the digital video image in a zig-zag pattern during encoding. One result of this zig-zag pattern is that data from the first block, e.g., Pixel(row 4, col. 1), must be temporally saved until all the pixel blocks in the first horizontal row of horizontal blocks have been processed and the system returns to process Pixel(row 5, col. 1). Such temporary saves typically require a data save operation and a data read back operation once every four rows. In addition, a register must typically be devoted to maintain a pointer to the temporarily saved data.

It is an object of the present invention to provide a more efficient difference encoding system which avoids the temporary data save operations typically associated with vertical difference encoding.

It is a further object of the present invention to eliminate the use of a register for maintaining the address of temporarily stored data typically associated with vertical difference encoding.

Further objects and advantages of the invention will become apparent from the description of the invention which follows.

SUMMARY OF THE INVENTION

Embodiments in accordance with the present invention comprise, respectively, a method, apparatus, computer system, and computer-readable medium for compressing a two-dimensional array of pixels. According to one embodiment of the invention, a plurality of first column pixel differences is generated by successive pixels in a first column with a first pixel of the first column of the array. A plurality of row pixel differences is generated for each row of the array by differencing successive pixels in said each row with an adjacent previous pixel in said each row and a compressed digital video signal representative of the two-dimensional array of pixels is formed by compressing each first column pixel difference of the plurality of first column pixel differences and by compressing each row pixel difference of the plurality of row pixel differences for each row of the array.

DETAILED DESCRIPTION OF THE PREFERRED EMBODIMENT

Figure 1:
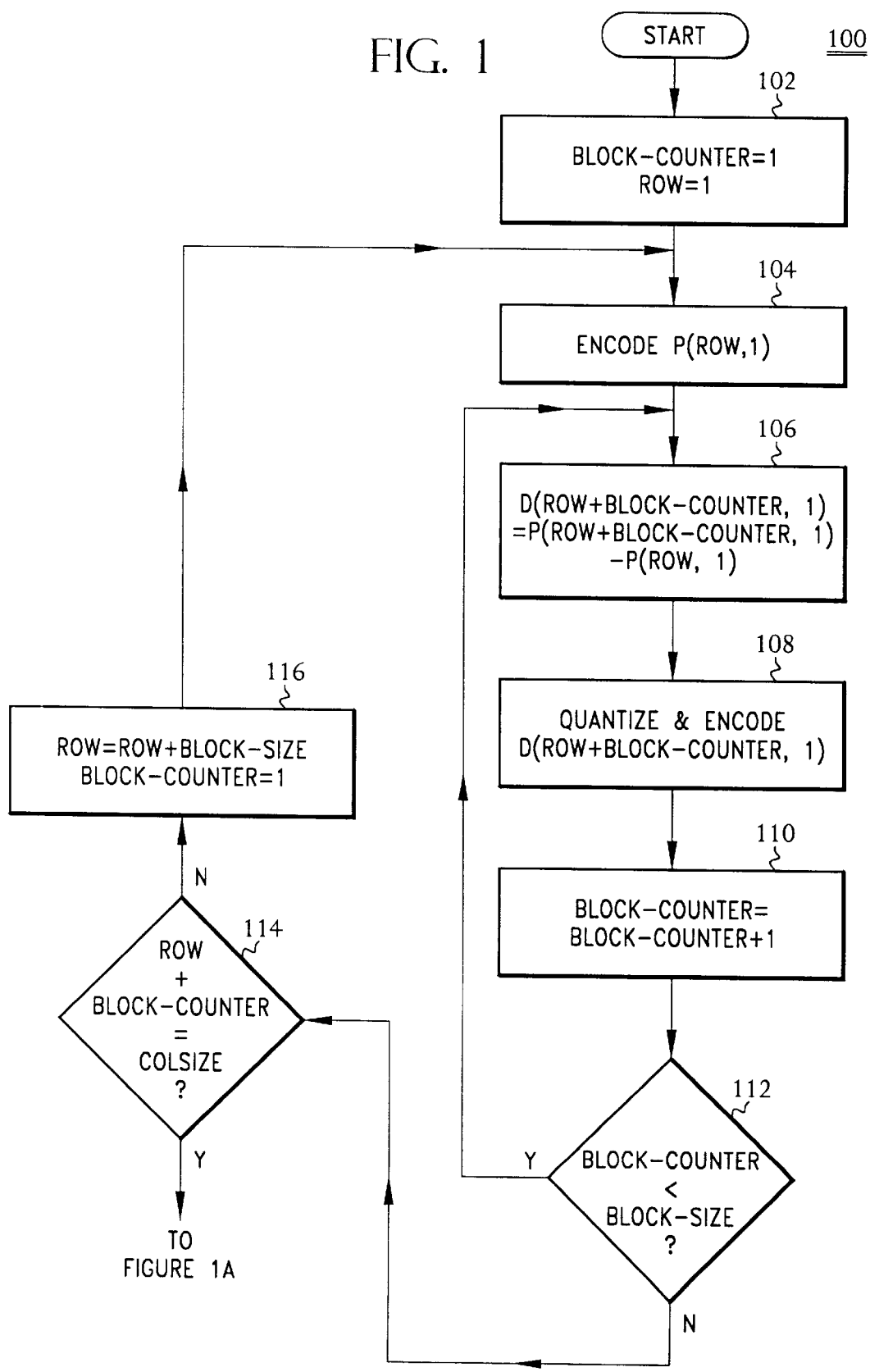
FIGS. 1 and 1A together show a block flow diagram of a system for compressing a digital video image in accordance with a preferred embodiment of the present invention.
Figure 1A:
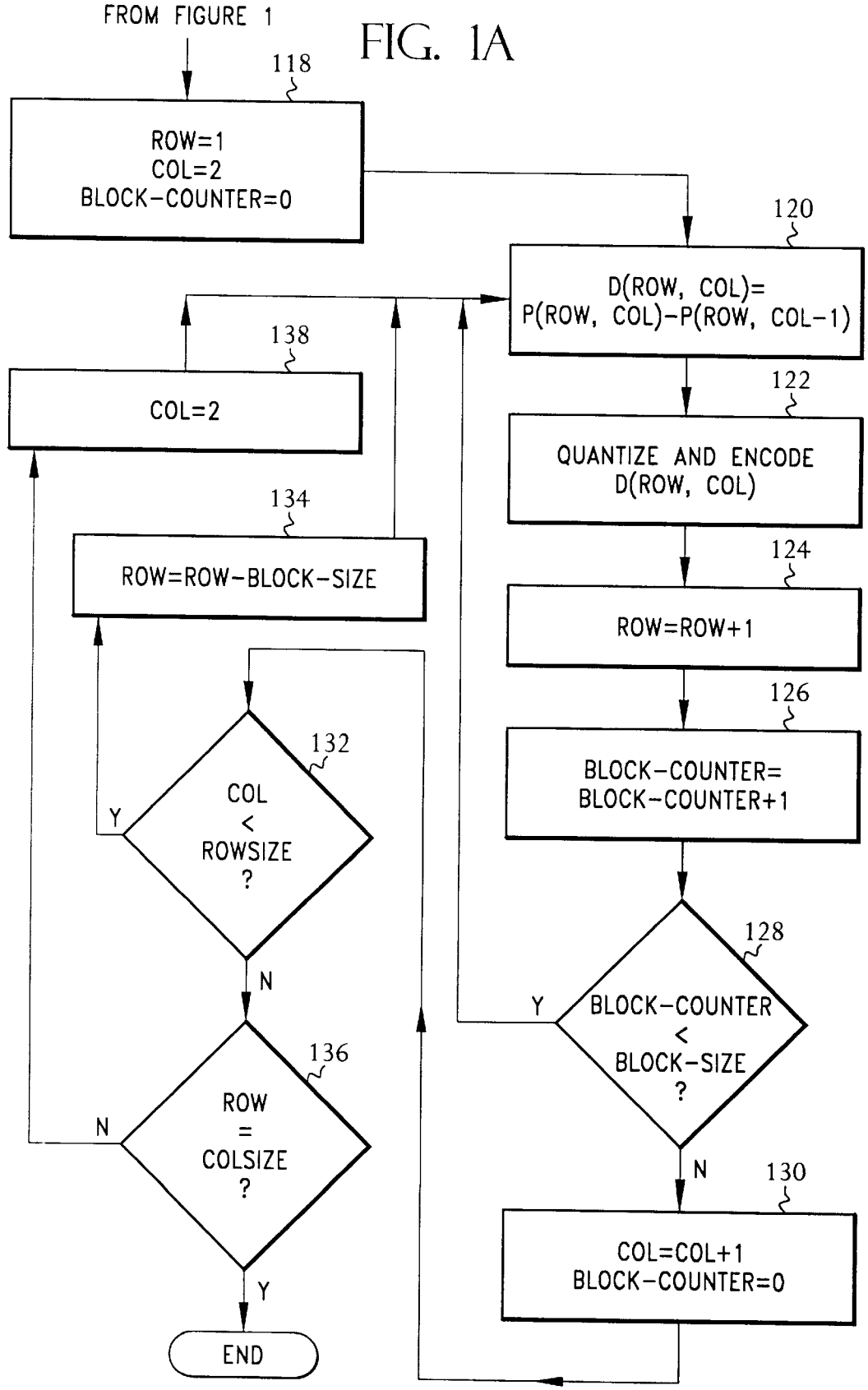

Referring now to FIGS. 1, 1A, a block flow diagram of a system 100 for compressing (or encoding) a digital video signal that is representative of a digital video image in accordance with a preferred embodiment of the present invention is shown. For purposes of the present application, the term digital video image means a two-dimensional array of digital pixel values which collectively depict all or part of a physical image or scene, including individual images within a sequence of motion video images. As explained more fully below, the preferred embodiment of the present invention uses an improved vertical differencing compression method to encode the pixels in the first column of the image, and then a horizontally-based vector quantization compression method is used to encode the pixels in all other columns of the image.

Before system 100 begins the compression process, initialization means 102 assigns a value of one to the parameters BLOCK_COUNTER and ROW. The parameter BLOCK_COUNTER is used to point to the position of a pixel within the pixel block being encoded, and the parameter ROW is used to point to the row occupied by the upper-most pixel in the pixel block currently being encoded by system 100. After these parameters are initialized, encoder 104 encodes Pixel(Row, 1), i.e., the pixel located in the row represented by the parameter "Row" and the first column of the image being encoded. Encoder 104 encodes the value of Pixel(Row, 1) as if it were a stand alone value, without reference to any differences between that pixel and any neighboring pixels. As explained more fully below, the output of encoder 104 is used in combination with the outputs of other encoding means to generate a compressed digit video signal that is representative of the image being compressed.

Subtractor 106 is provided for determining a vertical pixel difference value "D" representative of the difference between Pixel(Row+Block_counter, 1) and Pixel(row, 1). In one embodiment, subtractor 106 accepts as its inputs electrical signals representative of the values of Pixel(Row+Block_counter, 1) and Pixel(row, 1) and generates as its output an electrical signal representative of the difference between such input signals. Encoder 108 quantizes and encodes the output of subtractor 106. As was the case with encoder 104, the output of encoder 108 is used in combination with the outputs of other encoding means to generate a compressed digital video signal that is representative of the image being compressed.

Next, incrementing means 110 increments the value of the BLOCK_COUNTER parameter, and comparator 112 determines whether the BLOCK_COUNTER parameter has exceeded the constant BLOCK_SIZE. In the preferred embodiment of compression system 100, the constant BLOCK_SIZE is set at a value of 4, although other values may be used. If the value of BLOCK_SIZE has not been exceeded, processing returns to subtractor 106 and the process is repeated. When the system passes through subtractor 106 for a second time, the value of BLOCK_COUNTER will have been incremented but the value of Row will be the same as it was during the initial pass through subtractor 106. In this way, subtractor 106 uses the same pixel, i.e., Pixel(Row, 1), as the basis for determining multiple vertical pixel difference values for a plurality of pixels in the same vertical pixel block during the compression process.

If the value of BLOCK_SIZE has been exceeded, comparator 112 determines whether the value of (Row+Block_counter) is equal to the constant COLSIZE which represents the number of pixels in each column of the image being encoded. If these values are not equal, means 116 increments the parameter ROW by the constant BLOCK_SIZE, initializes the value of BLOCK_COUNTER to 1, and processing returns to encoder 104 to encode a further pixel block in the first column of the overall image being encoded. When comparator 112 determines that the value of (Row+Block_counter) is not equal to the constant COLSIZE, this signifies that all pixels in the first column of the image have been encoded, and processing passes to initialization means 118.

Initialization means 118 assigns values of one and zero, respectively, to the parameters ROW and BLOCK_COUNTER. In addition, initialization means 118 assigns a value of two to the parameter COL which is used to point to the column of pixels currently being encoded by system 100. Subtractor 120 is provided for determining a horizontal pixel difference value D representative of the difference between Pixel(Row, Col) and Pixel(row, col−1). In one embodiment, subtractor 106 accepts as its inputs electrical signals representative of the values of Pixel(Row, col) and Pixel(row, col−1) and generates as its output an electrical signal representative of the difference between such input signals. Encoder 122 quantizes and encodes the output of subtractor 120. The output of encoder 122 is used in combination with the outputs of the other encoders described above to generate a compressed digital video signal that is representative of the image being compressed.

Next, incrementing means 124, 126, respectively, increment the values of the BLOCK_COUNTER and ROW parameters, and comparator 128 determines whether the BLOCK_COUNTER parameter is less than the constant BLOCK_SIZE. If the value of BLOCK_COUNTER is less than BLOCK_SIZE, processing returns to subtractor 120 and the process is repeated; otherwise, incrementing means 130 increments the value of the parameter COL by one, the BLOCK_COUNTER parameter is again set to zero, and comparator 132 determines whether the value of COL is less than the constant ROWSIZE. The constant ROWSIZE represents the number of pixels in each row of the image being encoded. If the value of COL is less than ROWSIZE, then decrementing means 134 decrements the parameter ROW by the constant BLOCK_SIZE and processing returns to subtractor 120; otherwise, comparator 136 determines whether the parameters ROW and COL are equal. If these parameters are not equal, then initialization means 138 sets the parameter COL to two and processing returns again to subtractor 120.

Figure 2:
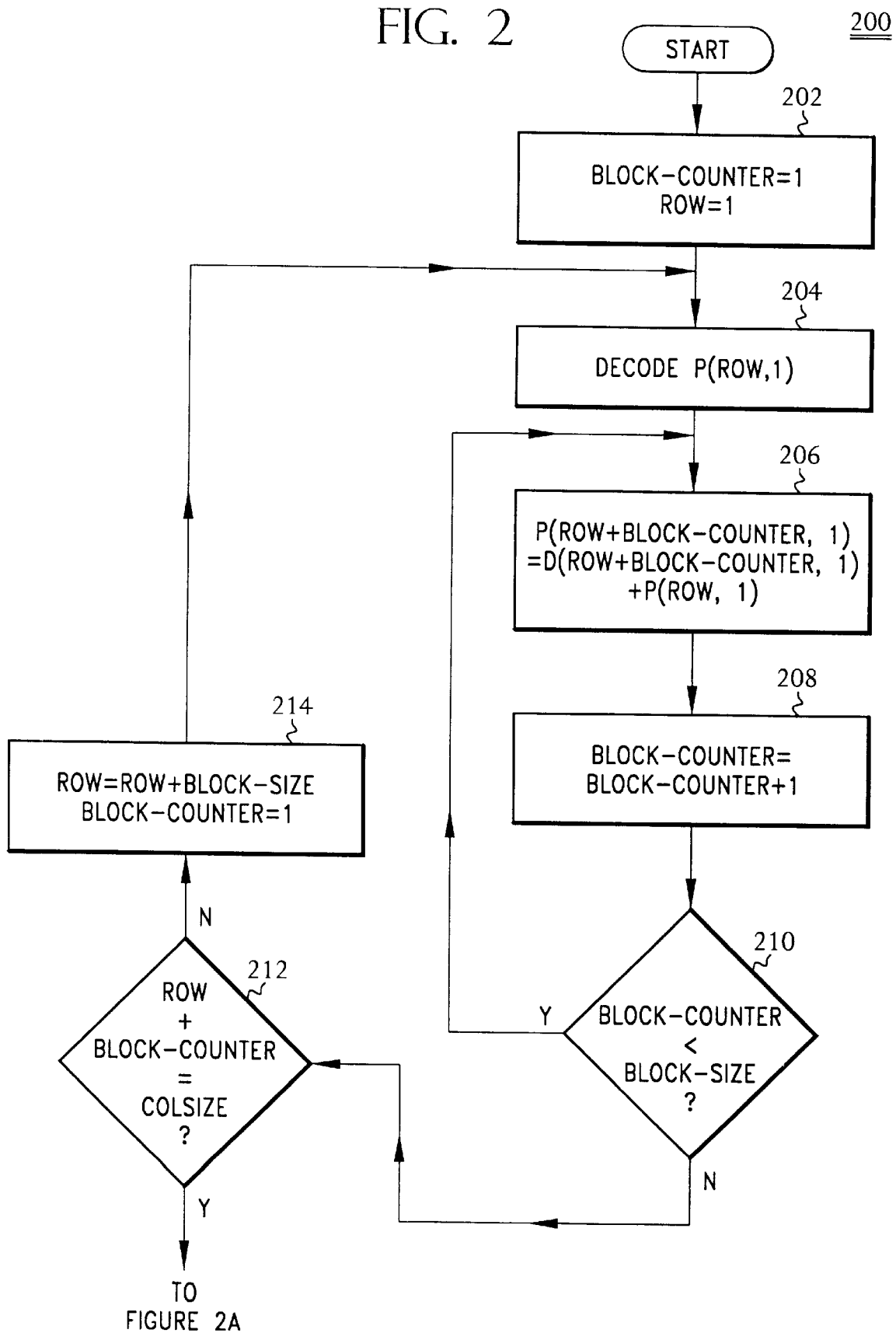
FIGS. 2 and 2A together show a block flow diagram of a system for decompressing a compressed digital video signal representative of a digital video image in accordance with a preferred embodiment of the present invention.
Figure 2A:
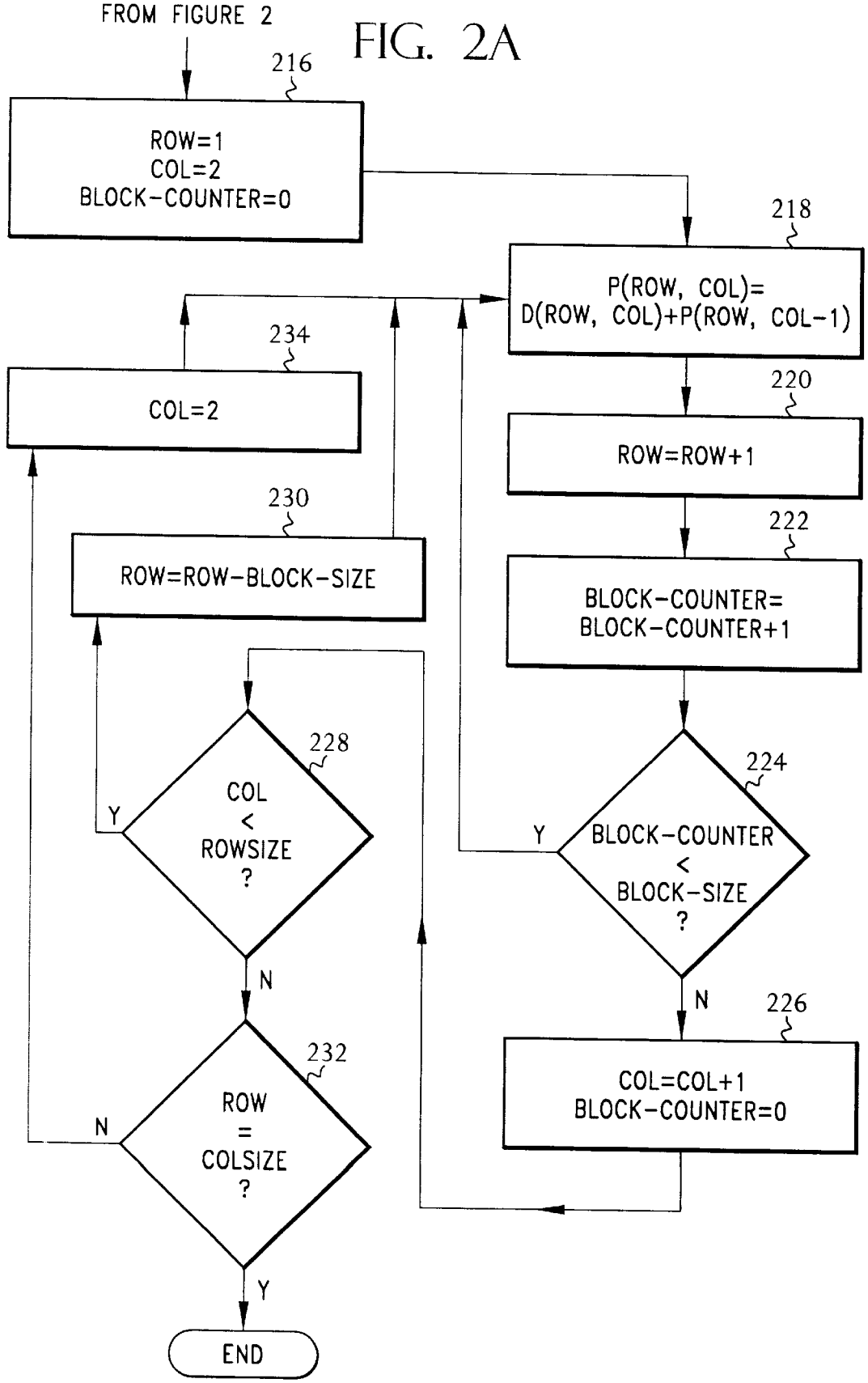

Referring now to FIGS. 2, 2A, a block flow diagram of a system 200 for decompressing (or decoding) a compressed digital video signal representative of a digital video image in accordance with a preferred embodiment of the present invention is shown. Decompression system 200 is the functional inverse of compression system 100. Thus, in the preferred embodiment of the present invention, vertical differencing is used in decoding the pixels in the first column of the compressed image, and then horizontally-based vector dequantization is used to decode the pixels in all other columns of the compressed image.

Before system 200 begins the decompression process, initialization means 202 assigns a value of one to the parameters BLOCK_COUNTER and ROW. The parameter BLOCK_COUNTER is used to point to the position of a pixel within a pixel block being decoded, and the parameter ROW is used to point to the row occupied by the upper-most pixel in the pixel block currently being decoded by system 200. After these parameters are initialized, decoder 204 decodes Pixel(Row, 1). Decoder 204 decodes the value of Pixel(Row, 1) as if it were a stand alone value, without reference to any differences between that pixel and any neighboring pixels. Decoder 204 accepts as its input a compressed digital video signal and, as explained more fully below, the output of decoder 204 is used in combination with the outputs of other decoding means to generate a decompressed digital video signal that is representative of the digital video signal being decompressed.

Decoder 206 is provided for determining a pixel value "P" representative of the sum of Pixel(row, 1) and the difference "D" between Pixel(Row, 1) and Pixel(Row+Block_counter, 1). In one embodiment, decoder 206 accepts as its inputs electrical signals representative of the values of Pixel(row, 1) and the difference "D" between Pixel(Row, 1) and Pixel (Row+Block_counter, 1), and generates as its output an electrical signal representative of the sum of such input signals. Decoder 206 accepts as its input a compressed digital video signal and, as was the case with decoder 204, the output of decoder 206 is used in combination with the outputs of other decoding means to generate a decompressed digital video signal that is representative of the image being decompressed.

Next, incrementing means 208 increments the value of the BLOCK_COUNTER parameter, and comparator 210 determines whether the BLOCK_COUNTER parameter is less than the constant BLOCK_SIZE. In the preferred embodiment of decompression system 200, the constant BLOCK_SIZE is set at a value of 4, although other values may be used. If the value of BLOCK_SIZE has not been exceeded, processing returns decoder 206 and the process is repeated. When the system passes through decoder 206 for a second time, the value of BLOCK_COUNTER will have been incremented but the value of ROW will be the same as was during the initial pass through decoder 206. In this way, decoder 206 uses the same pixel, i.e., Pixel(Row, 1), as the basis for determining values for a plurality of pixels in the same vertical pixel block during the decompression process.

If the value of BLOCK_SIZE has been exceeded, comparator 212 determines whether the value of (Row+Block_counter) is equal to the constant COLSIZE which represents the number of pixels in each column of the image being decoded. If these values are not equal, means 214 increments the parameter ROW by the constant BLOCK_SIZE, initializes the value of BLOCK_COUNTER to 1, and processing returns to decoder 204 to decode a further pixel block in the first column of the overall image being decoded. When comparator 212 determines that the value of (Row+Block_counter) is not equal to the constant COLSIZE, this signifies that all pixels in the first column of the image have been decoded, and processing passes to initialization means 216.

Initialization means 216 assigns values of one and zero respectively to the parameters ROW and BLOCK_COUNTER. In addition, initialization means 216 assigns a value of two to the parameter COL which is used to point to the column of pixels currently being decoded by system 200. Decoder 218 is provided for summing the value of Pixel (row, col) and the horizontal pixel difference value "D" representative of the difference between Pixel(Row, Col) and Pixel(row, col−1). In one embodiment, decoder 218 accepts as its inputs electrical signals representative of the values of Pixel(Row, col) and the horizontal pixel difference value D representative of the difference between Pixel(Row, Col) and Pixel(row, col−1), and generates as its output an electrical signal representative of the sum of such input signals. The output of decoder 218 is used in combination with the outputs of the other decoders described above to generate a decompressed digital video signal that is representative of the image being decompressed.

Next, incrementing means 220, 222, respectively, increment the values of the ROW and BLOCK_COUNTER parameters, and comparator 224 determines whether the BLOCK_COUNTER parameter is less than the constant BLOCK_SIZE. If the value of BLOCK_COUNTER is less than BLOCK_SIZE, processing returns to decoder 218 and the process is repeated; otherwise, incrementing means 226 increments the value of the parameter COL by one, the BLOCK_COUNTER parameter is again set to zero, and comparator 228 determines whether the value of COL is less than the constant ROWSIZE. The constant ROWSIZE represents the number of pixels in each row of the image being decoded. If the value of COL is less than ROWSIZE, then decrementing means 230 decrements the parameter ROW by the constant BLOCK_SIZE and processing returns to decoder 218; otherwise, comparator 232 determines whether the parameters ROW and COL are equal. If these parameters are not equal, then initialization means 234 sets the parameter COL to two and processing returns again to decoder 218.

The present invention may be implemented using an Intel model 386, 486 or a higher powered processor, or a general purpose processor. The present invention may be embodied in other specific forms without departing from the spirit or essential attributes of the invention. Accordingly, reference should be made to the appended claims, rather than the foregoing specification, as indicating the scope of the invention.

What is claimed is:

1. A method for compressing a two-dimensional array of pixels, comprising the steps of:

(a) generating a plurality of first column pixel differences by differencing successive pixels in a first column with a first pixel of the first column of the array;

(b) generating a plurality of row pixel differences for each row of the array by differencing successive pixels in said each row with an adjacent previous pixel in said each row; and (c) forming a compressed digital video signal representative of the two-dimensional array of pixels by compressing each first column pixel difference of the plurality of first column pixel differences and by compressing each row pixel difference of the plurality of row pixel differences for each row of the array.

2. The method of claim 1, wherein the two-dimensional array of pixels represents one of a plurality of blocks constituting a digital video image.

3. The method of claim 2, wherein:

the digital video image comprises a first pixel column comprising the first column of the array;

the plurality of blocks comprises a first column of blocks that encompasses the first pixel column of the digital video image; and step (a) is repeated for each block of the first column of blocks and step (b) is repeated for each block of the digital video image.

4. The method of claim 2, wherein:

the digital video image comprises a first pixel column comprising the first column of the array;

the plurality of blocks comprises a first column of blocks that encompasses the first pixel column of the digital video image;

step (a) is repeated for each block of the first column of blocks before step (b) by generating a plurality of first column pixel differences for each block of the first column of blocks by differencing successive pixels in a first column of each said block with a first pixel of the first column of each said block; and step (b) is repeated for each block of the digital video image by consecutively processing each row of the digital video image from the top to the bottom of the digital video image.

5. An apparatus for compressing a two-dimensional array of pixels, comprising:

(a) means for generating a plurality of first column pixel differences by differencing successive pixels in a first column with a first pixel of the first column of the array;

(b) means for generating a plurality of row pixel differences for each row of the array by differencing successive pixels in said each row with an adjacent previous pixel in said each row; and (c) means for forming a compressed digital video signal representative of the two-dimensional array of pixels by compressing each first column pixel difference of the plurality of first column pixel differences and by compressing each row pixel difference of the plurality of row pixel differences for each row of the array.

6. The apparatus of claim 5, wherein the two-dimensional array of pixels represents one of a plurality of blocks constituting a digital video image.

7. The apparatus of claim 6, wherein:

the digital video image comprises a first pixel column comprising the first column of the array; and the plurality of blocks comprises a first column of blocks that encompasses the first pixel column of the digital video image; the apparatus further comprising:

means for repeating the generating of means (a) for each block of the first column of blocks; and means for repeating the generating of means (b) for each block of the digital video image.

8. The apparatus of claim 6, wherein:

the digital video image comprises a first pixel column comprising the first column of the array; and the plurality of blocks comprises a first column of blocks that encompasses the first pixel column of the digital video image; the apparatus further comprising:

means for repeating the generating of means (a) for each block of the first column of blocks before the generating of means (b) by generating a plurality of first column pixel differences for each block of the first column of blocks by differencing successive pixels in a first column of each said block with a first pixel of the first column of each said block; and means for repeating the generating of means (b) for each block of the digital video image by consecutively processing each row of the digital video image from the top to the bottom of the digital video image.

9. A computer-readable medium having stored thereon a plurality of instructions, wherein the plurality of instructions, when executed by a processor, cause the processor to perform the steps of:

(a) generating a plurality of first column pixel differences by differencing successive pixels in a first column with a first pixel of the first column of a two-dimensional array of pixels;

(b) generating a plurality of row pixel differences for each row of the array by differencing successive pixels in said each row with an adjacent previous pixel in said each row; and (c) forming a compressed digital video signal representative of the two-dimensional array of pixels by compressing each first column pixel difference of the plurality of first column pixel differences and by compressing each row pixel difference of the plurality of row pixel differences for each row of the array.

10. The computer-readable medium of claim 9, wherein the two-dimensional array of pixels represents one of a plurality of blocks constituting a digital video image.

11. The computer-readable medium of claim 10, wherein:

the digital video image comprises a first pixel column comprising the first column of the array;

the plurality of blocks comprises a first column of blocks that encompasses the first pixel column of the digital video image; and step (a) is repeated for each block of the first column of blocks and step (b) is repeated for each block of the digital video image.

12. The computer-readable medium of claim 10, wherein:

the digital video image comprises a first pixel column comprising the first column of the array;

the plurality of blocks comprises a first column of blocks that encompasses the first pixel column of the digital video image;

step (a) is repeated for each block of the first column of blocks before step (b) by generating a plurality of first column pixel differences for each block of the first column of blocks by differencing successive pixels in a first column of each said block with a first pixel of the first column of each said block; and step (b) is repeated for each block of the digital video image by consecutively processing each row of the digital video image from the top to the bottom of the digital video image.

* * * * *